US012799233B2

(12) United States Patent
Yuan et al.

(10) Patent No.: US 12,799,233 B2
(45) Date of Patent: Nov. 17, 2026

(54) PREPARATION METHOD OF BIFUNCTIONAL DEXTRIN WITH HIGH EMBEDDING RATE AND RAPID ABSORPTION

(71) Applicant: QILU UNIVERSITY OF TECHNOLOGY, Jinan City (CN)

(72) Inventors: Chao Yuan, Jinan City (CN); Bo Cui, Jinan City (CN); Wenfang Yue, Jinan City (CN); Wentao Ma, Jinan City (CN)

( * ) Notice: Subject to any disclaimer, the term of this patent is extended or adjusted under 35 U.S.C. 154(b) by 727 days.

(21) Appl. No.: 18/305,446

(22) Filed: Apr. 24, 2023

(65) Prior Publication Data

US 2023/0340163 A1 Oct. 26, 2023

(30) Foreign Application Priority Data

Apr. 24, 2022 (CN) ......................... 202210449713.0

(51) Int. Cl.
*C08B 37/16* (2006.01)

(52) U.S. Cl.
CPC ................................ *C08B 37/0012* (2013.01)

(58) Field of Classification Search
CPC ........................ C08B 37/0012; C08B 37/0015
See application file for complete search history.

(56) References Cited

U.S. PATENT DOCUMENTS 6,689,378 B1 * 2/2004 Sun ..................... C08B 37/0012
536/123
10,653,784 B2 * 5/2020 Yao ...................... A61K 31/343

FOREIGN PATENT DOCUMENTS

JP 2008024608 A * 2/2008

OTHER PUBLICATIONS

Zhang, Xuejiao et al., Carbohydrate Polymers, "Beta-Cyclodextrin grafting hyperbranched polyglycerols as carriers for nasal insulin delivery", 2011, vol. 84, pp. 1419-1425 (Year: 2011).*

* cited by examiner

*Primary Examiner* — Bahar Craigo
(74) *Attorney, Agent, or Firm* — Lambert Shortell & Connaughton; David J. Connaughton, Jr.; Justin P. Tinger

(57) ABSTRACT

The present disclosure relates to a preparation method of a bifunctional dextrin with a high embedding rate and rapid absorption. The preparation method includes the following steps: conducting an alkali treatment: adding 10 g of a highly-branched cyclodextrin into a 250 mL Erlenmeyer flask, adding 100 mL of a 2 mol/L NaOH solution, and conducting a treatment in a water bath at 30° C. for 1 h; conducting a high-pressure treatment; mixing materials: adding a cross-linking agent polyacrylic acid and a catalyst sodium dihydrogen phosphate, adding β-cyclodextrin, immersing while stirring for 30 min, and drying; conducting stepwise heating: heating an obtained mixed material in an oven at 90° C. for 15 min, heating to 160° C., and treating for 10 min; and conducting product acquisition: stopping heating, rinsing an obtained heated product with distilled water, conducting filtering to remove impurities, washing twice with 50° C. distilled water, drying, and collecting a resulting finished product.

2 Claims, 5 Drawing Sheets

PREPARATION METHOD OF BIFUNCTIONAL DEXTRIN WITH HIGH EMBEDDING RATE AND RAPID ABSORPTION

CROSS REFERENCE TO RELATED APPLICATION

This patent application claims the benefit and priority of Chinese Patent Application No. 202210449713.0, filed with the China National Intellectual Property Administration on Apr. 24, 2022, the disclosure of which is incorporated by reference herein in its entirety as part of the present application.

TECHNICAL FIELD

The present disclosure belongs to the technical field of food processing, and relates to a preparation method of a bifunctional dextrin with a high embedding rate and rapid absorption.

BACKGROUND

In economically developed countries or regions, the pressure of life, work, and study leads to the decline of people's physical fitness, weakened endurance, emotional anxiety, and impatience. As a result, various sub-health problems occur, such as neurasthenia, endocrine and metabolic disorders, and low immunity. There are a variety of natural active substances in nature that have desirable health care functions and can help human beings prevent the health problems they face. However, some of the natural active substances cannot be fully applied in products due to deficiencies in certain aspects such as stability, absorption, and flavor.

It is an effective method to embed organic molecules using cyclodextrins. The β-cyclodextrin belongs to cyclic maltooligosaccharides, and is a truncated cone structure composed of seven D-glucopyranose molecules via α-1,4-glycosidic bonds. The characteristics of "hydrophobic on the inside and hydrophilic on the outside" and the unique cavity structure make the β-cyclodextrin have a relatively excellent embedding effect on natural active substances, thereby improving the stability of embedding and masking the bad flavor. However, the potential of β-cyclodextrin in the food industry has been underestimated due to poor solubility, low nutritional value, and inability to enhance the absorption of natural active substances.

The branching enzyme produced by *Bacillus thermophilus* acts on waxy corn starch, and a novel highly-branched cyclodextrin is obtained through cyclization. In addition to a ring structure formed by varying amounts of D-glucopyranose molecules, a backbone of the novel highly-branched cyclodextrin is still a large number of branched chains composed of glucose units, as shown in FIG. 1. Studies have proved that this novel highly-branched cyclodextrin can be taken normally by people. Although having a molecular weight of about 400 KDa, the highly-branched cyclodextrin shows strong water solubility and is easily decomposed by α-amylase, and then quickly converted into small-molecular saccharides in the intestinal tract. This is conducive to the digestion and absorption of the human body, enhances endurance, and does not cause adverse reactions on the gastrointestinal tract. Meanwhile, raw materials are rich in sources and cost-effective. The highly-branched cyclodextrin can be added to a functional beverage in a suitable proportion. Compared with traditional beverages with sucrose as a main raw material, a resulting novel beverage has an osmotic pressure approximately to that of human body fluids. Accordingly, the novel beverage is suitable for rapid absorption in vivo, replenishes energy, and has an effect of reducing inflammation. Studies have shown that the highly-branched cyclodextrin does not have a unique cavity structure similar to that of cyclodextrins. As a result, an embedding effect of the highly-branched cyclodextrin on natural active substances is not ideal, resulting in many advantages that cannot be reflected in some functional foods.

Therefore, it is conceived to take into account the advantages of both highly-branched cyclodextrin and β-cyclodextrin, and create a new type of bifunctional dextrin by grafting. There are a large number of branches connected around a ring of the highly-branched cyclodextrin, such that grafting of the highly-branched cyclodextrin is similar to that of amylopectin.

Traditional grafting methods include free radical initiation and ionic initiation. The ionic initiation cannot be conducted in the presence of water; and the ionic initiation requires an expensive technology, which is not suitable for mass production. In the traditional free radical initiation, the most deeply-studied initiator is Ce(IV) ions, which can conduct reactions smoothly at around room temperature. Moreover, the Ce(IV) ions have high initiation speed, desirable efficiency, and strong reproducibility. However, cerium salts have an extremely high cost. In addition, there are still many initiators in the free radical initiation, but these initiators all have some drawbacks. Epoxidation is a method for grafting cyclodextrins on the cellulose with an epoxy group of epichlorohydrin as a cross-linking bridge. However, this method has a mediocre grafting effect. Therefore, it is necessary to select a suitable grafting method and a corresponding cross-linking agent to replace the above two technologies, thus taking into account the requirements of efficiency, cost, and industrialization. The cross-linking agent is cross-linked with the highly-branched cyclodextrin, and then the cyclodextrin is grafted on the highly-branched cyclodextrin by the cross-linking agent. In this way, a bifunctional dextrin is obtained, which has a strong embedding capacity for natural active substances and retains rapid absorption of the highly-branched cyclodextrin. The polycarboxylic acid method is a widely-used and mature technology for grafting cyclodextrins. This method can adopt a wide variety of cross-linking agents, which have different grafting effects on the cyclodextrins. There are examples as follows: 1. Citric acid has low production cost and wide source of raw materials, but poor grafting effect. 2. Maleic acid shows lower grafting rate, and has been gradually eliminated in experiments. 3. Butane tetracarboxylic acid has desirable grafting effect, but it is high-cost. Therefore, it is of great development value and market potential to select an environmental-friendly, efficient, and cost-effective cross-linking agent to optimize a grafting process of the polycarboxylic acid method. Based on this, a bifunctional dextrin can be prepared, which is beneficial to human health and efficiently embeds natural active substances.

SUMMARY

In order to make up for the deficiencies in the prior art, the present disclosure provides a preparation method of a bifunctional dextrin with a high embedding rate and rapid absorption. In the present disclosure, by improving a traditional polycarboxylic acid method, an efficiency of grafting a cyclodextrin to a highly-branched cyclodextrin is improved by means of polyacrylic acid, and a novel bifunctional dextrin is prepared. The bifunctional dextrin is used for embedding some natural active substances, and can achieve an ideal embedding effect, strengthen product nutritions, and increase an absorption efficiency of the human body.

In the present disclosure, the preparation method is realized by adopting the following production processes, as shown in FIG. 2:

(1) conducting an alkali treatment on a highly-branched cyclodextrin: adding 10.0 g of the highly-branched cyclodextrin into a 250.0 mL Erlenmeyer flask, adding 100.0 mL of a 2 mol/L NaOH solution, and conducting a treatment in a water bath at 30° C. for 1 h;

(2) conducting a high-pressure treatment: placing an obtained alkali-treated highly-branched cyclodextrin in a high-pressure homogenizer, and conducting homogenization at a room temperature and a pressure of 200 MPa three times;

(3) mixing materials: adding a cross-linking agent polyacrylic acid and a catalyst sodium dihydrogen phosphate into an obtained high-pressure-treated highly-branched cyclodextrin, adding β-cyclodextrin, immersing while stirring for 30 min, and drying in an oven; where the polyacrylic acid and the β-cyclodextrin are at a concentration molar ratio of 2:1; and the catalyst sodium dihydrogen phosphate and the cross-linking agent are at a molar ratio of 1:10;

(4) conducting stepwise heating: heating an obtained mixed material in an oven set at 90° C. for 15 min, heating to 160° C., and treating for 10 min; and (5) conducting product acquisition: stopping heating, rinsing an obtained heated product with a small amount of distilled water, conducting filtering to remove impurities, washing twice with 50° C. distilled water, drying in an oven, and collecting a resulting finished product.

In step 1, the alkali treatment is intended to: (1) the alkali treatment activates the hydroxyl groups on the branched chains of the highly-branched cyclodextrin, which facilitates the reaction and combination with the cross-linking agent to increase a cross-linking efficiency. (2) During the alkali treatment, the fluidity of the solution and the plasticity of the branched chains are increased, such that the grafting is more sufficient.

Heating is conducted in a water bath under a temperature controlled at 30° C. through experimental optimization. First of all, a purpose of the water bath is to accelerate the alkali treatment, make the alkali treatment complete, increase the fluidity, and provide an alkaline environment. When the temperature of the water bath is less than 30° C., the activation is insufficient due to a low reaction temperature, and the reaction lasts for a too long time. When the temperature of the water bath is too high, the branched chains of the dextrin may be decomposed under the alkali treatment, causing the dextrin to be yellowed to affect the color of an obtained product.

In step 2, purposes of the high-pressure treatment include: (1) If the high-branched cyclodextrin has not been subjected to the high-pressure treatment, the branched chains are dense; and after directly adding a cross-linking agent, these branched chains are connected by the cross-linking agent, thus reducing the effect of cyclodextrin grafting. Moreover, the ability of the highly-branched cyclodextrin itself to embed or adsorb guests may be reduced, as shown in FIG. 3 and FIG. 4. (2) The alkali-treated dextrin is subjected to the high-pressure treatment under an optimal pressure, which can open a spatial structure of the branched chain of the dextrin molecule and destroy a secondary bond in the molecule. This is beneficial to the grafting of β-cyclodextrin in the next step; as shown in FIG. 5, the grafting effect is enhanced.

In step 2, the high-pressure treatment is conducted at a pressure of 200 MPa. According to the optimization analysis of the experiment, when the pressure is set lower than the optimal value, the opening degree of the spatial structure between branch chains is limited, and the ideal grafting effect cannot be fully achieved. When the pressure is set too high, the destruction of covalent bonds leads to breakage of the branched chains, thereby reducing a molecular weight of the dextrin and causing the loss of other physiological functions of the highly-branched cyclodextrin.

In step 3, the catalyst, polyacrylic acid, and β-cyclodextrin are uniformly mixed to prepare for the esterification and the grafting of cyclodextrin in step 4. The polyacrylic acid and the β-cyclodextrin are at a concentration molar ratio of 2:1, which is an optimal addition ratio determined by measuring a cross-linking rate, and can achieve a better cyclodextrin grafting effect. When the concentration molar ratio is insufficient, the polyacrylic acid has a low concentration, while there are many active hydroxyl sites on the dextrin branch chains. Accordingly, the cross-linking agent directly cross-links the branched chains, and the grafting of 3-cyclodextrin cannot be achieved, thus reducing the grafting effect of cyclodextrin. When the concentration molar ratio is excessive, the polyacrylic acid has an excess concentration. This makes the cross-linking agent intensively cross-link with the active sites on the branch chains, and also reduces the grafting effect of β-cyclodextrin and the embedding effect of a final product.

In step 4, when stepwise heating is selected, the temperature requirements for each stage of the reaction are different, and the esterification, cross-linking, and grafting are conducted under dry solid-state conditions. The cyclic anhydride formed from 90° C. has a lively nature and is easy to react with activated hydroxyl groups on the branch chains of the highly-branched cyclodextrin. Meanwhile, the completion of the cross-linking and grafting of polyacrylic acid can be ensured during the stepwise heating, such that the β-cyclodextrin can reach a maximum immobilization capacity. When the temperature is raised to 160° C., most of the cross-linking agents fully form cyclic anhydrides to efficiently complete the cross-linking and grafting.

In step 5, the product is purified by washing with distilled water at 50° C. to remove residual cross-linking agent and β-cyclodextrin.

The present disclosure has the following beneficial effects:

(1) In the present disclosure, a novel bifunctional dextrin formed by treating amylopectin with a branching enzyme is used. The bifunctional dextrin itself can be added to some foods as a nutritional supplement, to increase the functionality of the foods and provide energy for the human body. The bifunctional dextrin can also be added to some functional beverages instead of sucrose to form a solution, which is basically isotonic with an osmotic pressure of the human body and is easily absorbed by the human body. The bifunctional dextrin further has many functions such as anti-inflammation and enhancing human endurance, and is more functional than other commercial dextrins.

(2) In the present disclosure, a grafting efficiency between the highly-branched cyclodextrin and cyclodextrin molecules is improved by an improved polyacrylic acid grafting process. Due to the large number and dense distribution of branched chains in the highly-branched cyclodextrin, the high-pressure treatment is conducted to increase gaps between the branched chains. In this way, the steric hindrance is reduced to improve the efficiency during cyclodextrin grafting. High-pressure treatment is one of the innovative points of the present disclosure. Traditional polyacrylic acid grafting is a purely chemical process. However, in the present disclosure, physical treatment methods are added to improve the grafting effect. The preparation method is environmental-friendly and efficient, meets the current requirements for food production, and has bright prospects in the production and processing of functional foods.

(3) In the present disclosure, an obtained molecule of highly-branched cyclodextrin-β-cyclodextrin retains an excellent embedding function of β-cyclodextrin for active ingredients. Moreover, the molecule forms cross-linking between the branches of the highly-branched cyclodextrin, thus further increasing the embedding capacity of the bifunctional dextrin. Furthermore, the molecule also has the characteristics of the highly-branched cyclodextrin, which can be quickly absorbed by the human body to replenish energy and has a low osmotic pressure. The combination of the highly-branched cyclodextrin and β-cyclodextrin supplements each other, and the formed bifunctional dextrin molecule has multiple functions and wide application, showing a great potential in the food industry.

DETAILED DESCRIPTION OF THE EMBODIMENTS

Figure 1:
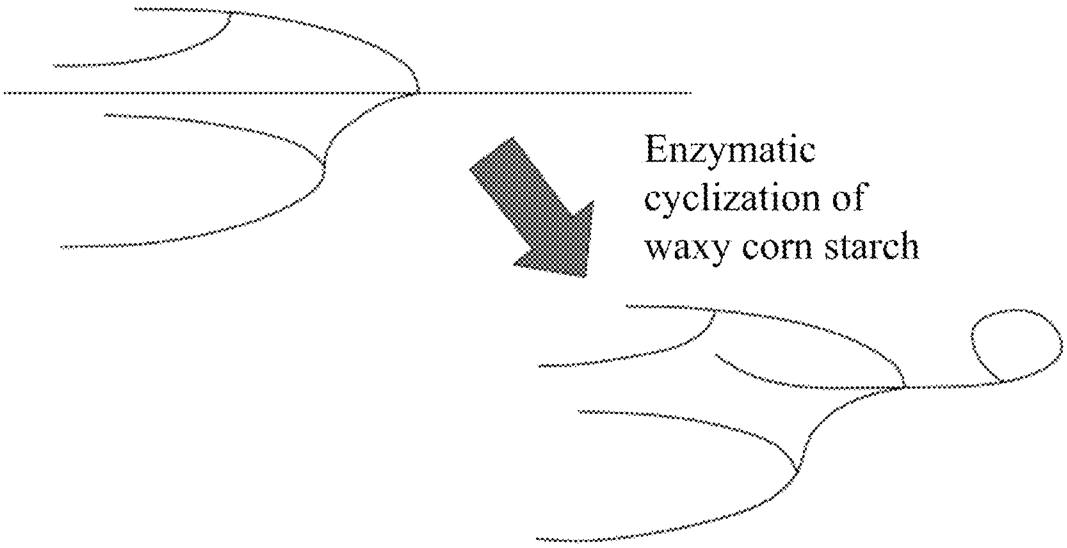
FIG. 1 shows a schematic diagram of the cyclization of a waxy corn starch under the action of an enzyme.
Figure 2:
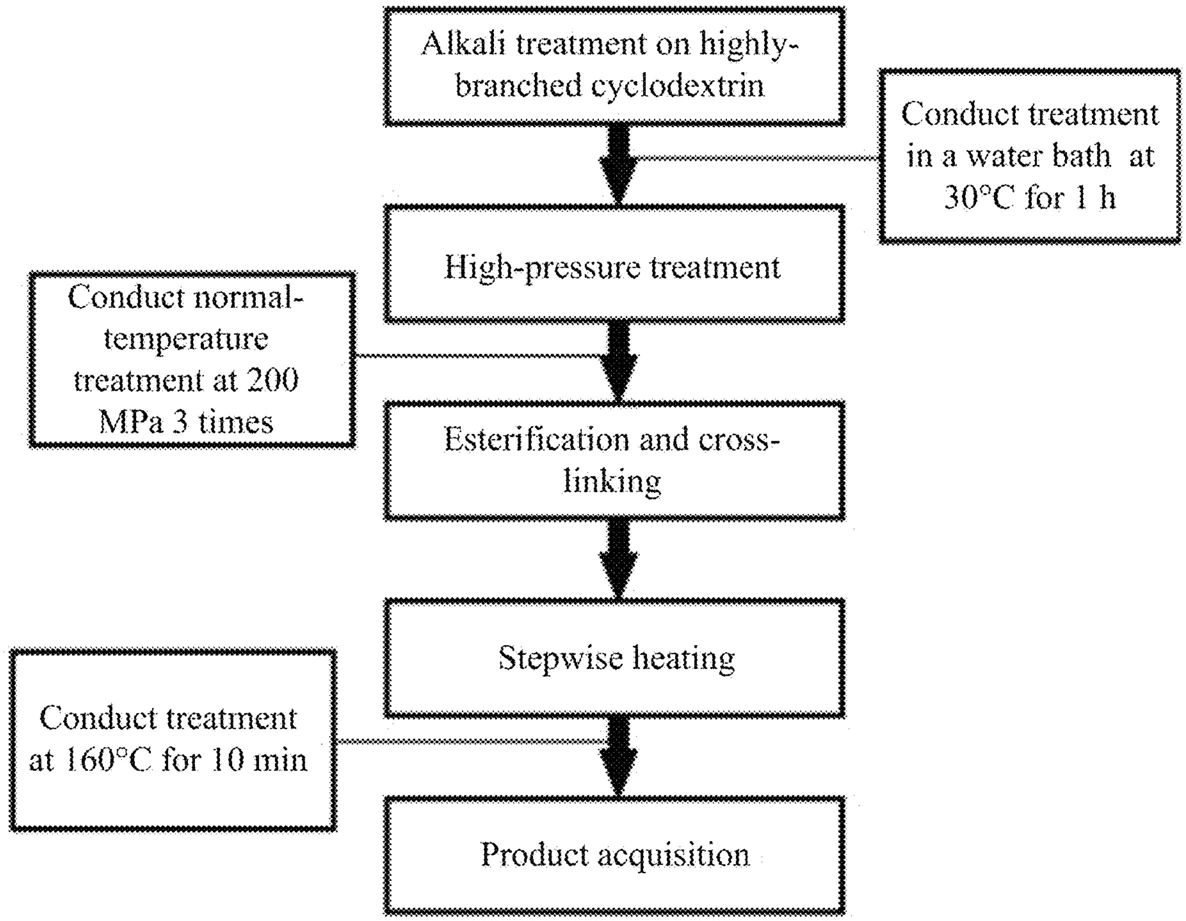
FIG. 2 shows a process flow diagram of the present disclosure.
Figure 3:
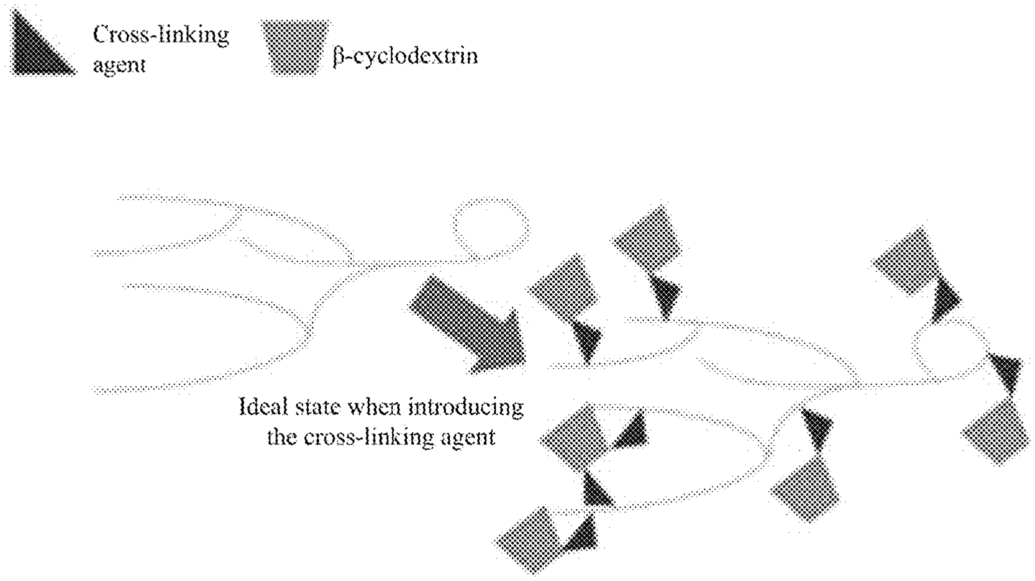
FIG. 3 shows a grafting schematic diagram under an ideal state for the highly-branched cyclodextrin without a high-pressure treatment.
Figure 4:
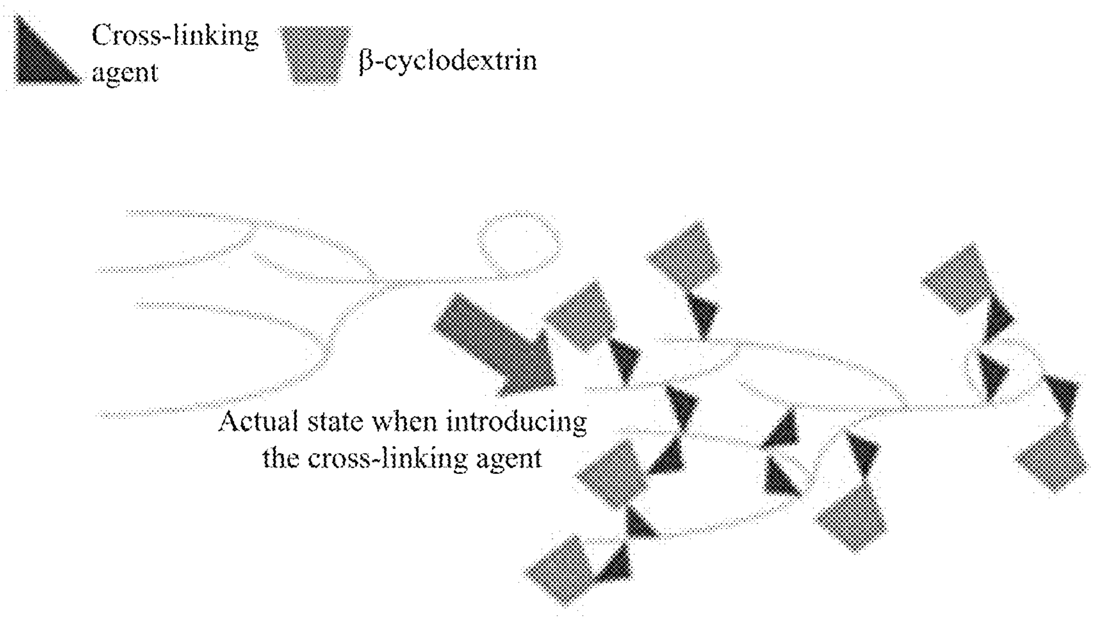
FIG. 4 shows a grafting schematic diagram under an actual state for the highly-branched cyclodextrin without the high-pressure treatment.
Figure 5:
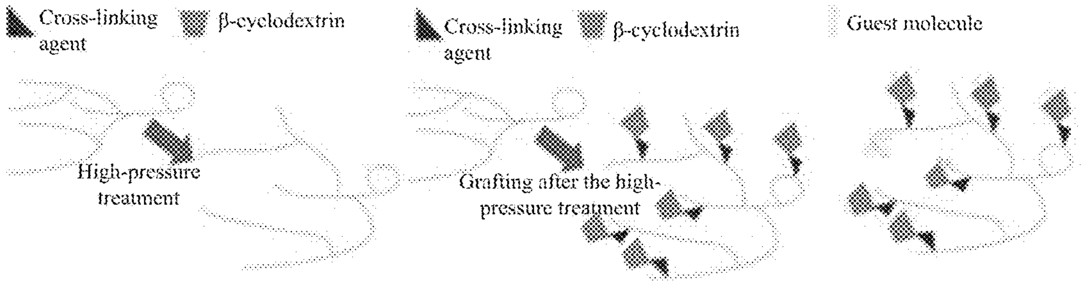
FIG. 5 shows a grafting schematic diagram for the highly-branched cyclodextrin with the high-pressure treatment.

The present disclosure will be described in further detail below in combination with specific examples, so as to help those skilled in the art have a more complete, accurate, and in-depth understanding of the inventive concepts and technical solutions of the present disclosure. The protection scope of the present disclosure includes but not limited to the following examples. Without departing from the spirit and scope of the present application, any modifications made to the details and forms of the technical solutions of the present disclosure shall fall within the protection scope of the present disclosure.

Example 1

Preparation of a Bifunctional Dextrin Embedding Cinnamaldehyde (1) Conducting an alkali treatment on a highly-branched cyclodextrin: 10.0 g of the highly-branched cyclodextrin was added into a 250.0 mL Erlenmeyer flask, 100.0 mL of a 2 mol/L NaOH solution was added, and a treatment in a water bath was conducted at 30° C. for 1 h.

(2) Conducting a high-pressure treatment: an obtained alkali-treated highly-branched cyclodextrin was placed in a high-pressure homogenizer, and homogenization was conducted at a room temperature and a pressure of 200 MPa three times.

(3) Mixing materials: a cross-linking agent polyacrylic acid and a catalyst sodium dihydrogen phosphate were added into an obtained high-pressure-treated highly-branched cyclodextrin, β-cyclodextrin was added, immersed while stirring for 0.5 h, taken out, and dried; where the polyacrylic acid and the β-cyclodextrin were at a concentration molar ratio of 2:1; and the catalyst sodium dihydrogen phosphate and the cross-linking agent were at a molar ratio of 1:10.

(4) Conducting stepwise heating: an obtained dried product was heated in an oven set at 90° C. for 15 min, heated to 160° C., and treated for 10 min.

(5) Conducting product acquisition: heating was stopped, an obtained heated product was rinsed with a small amount of distilled water, filtering was conducted to remove impurities, washed twice with 50° C. distilled water, dried in an oven, and a resulting finished product was collected.

(6) Obtaining cinnamaldehyde embedded in bifunctional dextrin molecules: 5 g of the product and cinnamaldehyde were added to the Erlenmeyer flask according to a host-to-guest molar ratio of 1:2, and 100 mL of distilled water was added. An obtained mixture was stirred in a water bath at 45° C. for 48 h, frozen overnight, and an embedding was obtained using a freeze-dryer.

Figure 6:
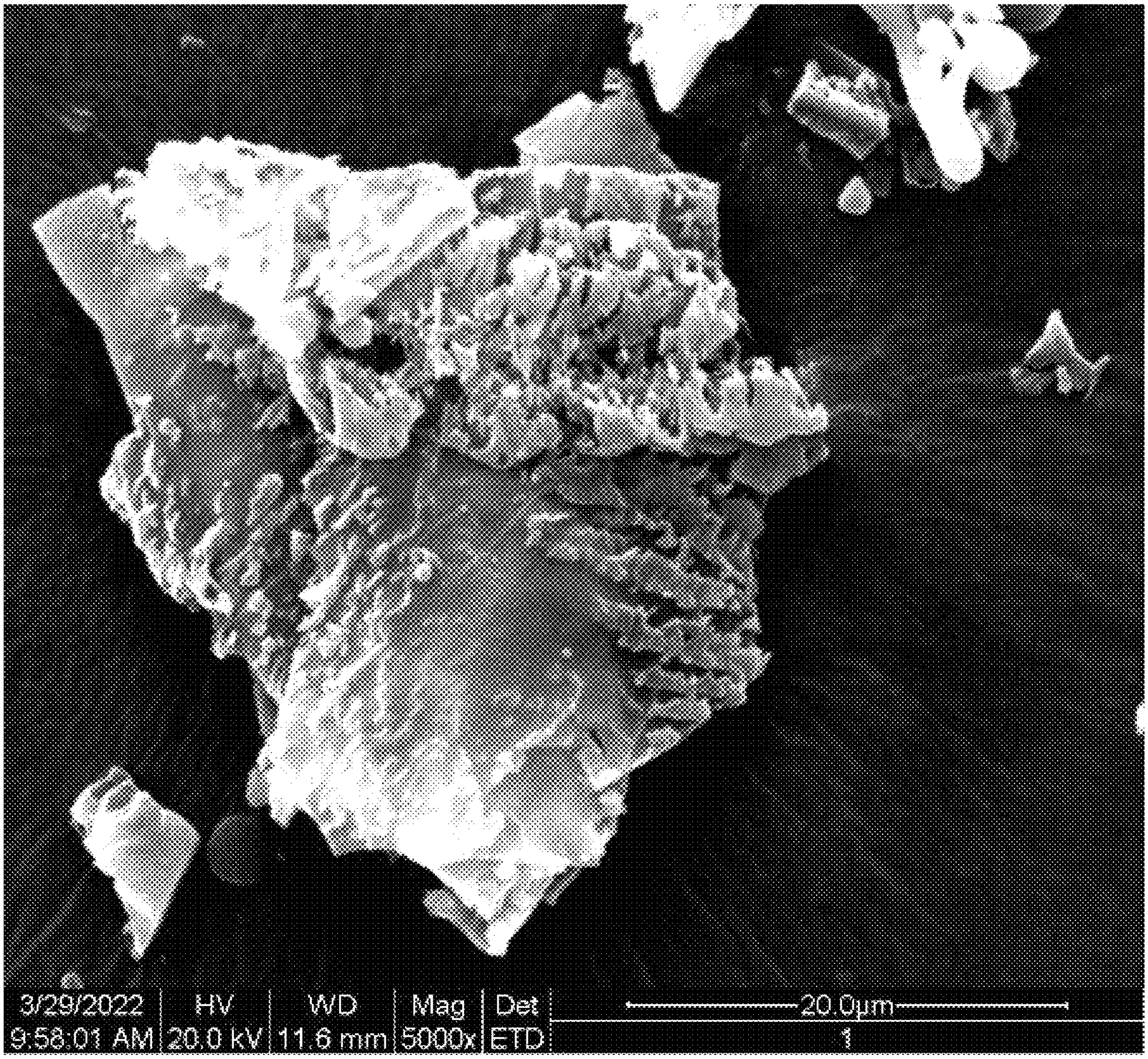
FIG. 6 shows a scanning electron microscopy (SEM) image of the highly-branched cyclodextrin grafted with β-cyclodextrin.

FIG. 6 showed a SEM image of the highly-branched cyclodextrin grafted with β-cyclodextrin. The β-cyclodextrin formed granular aggregates on a surface of the highly-branched cyclodextrin. The protrusions on the surface of the highly-branched cyclodextrin were the polyacrylic acid cross-linking agent that had not been successfully grafted to the cyclodextrin.

Figure 7:
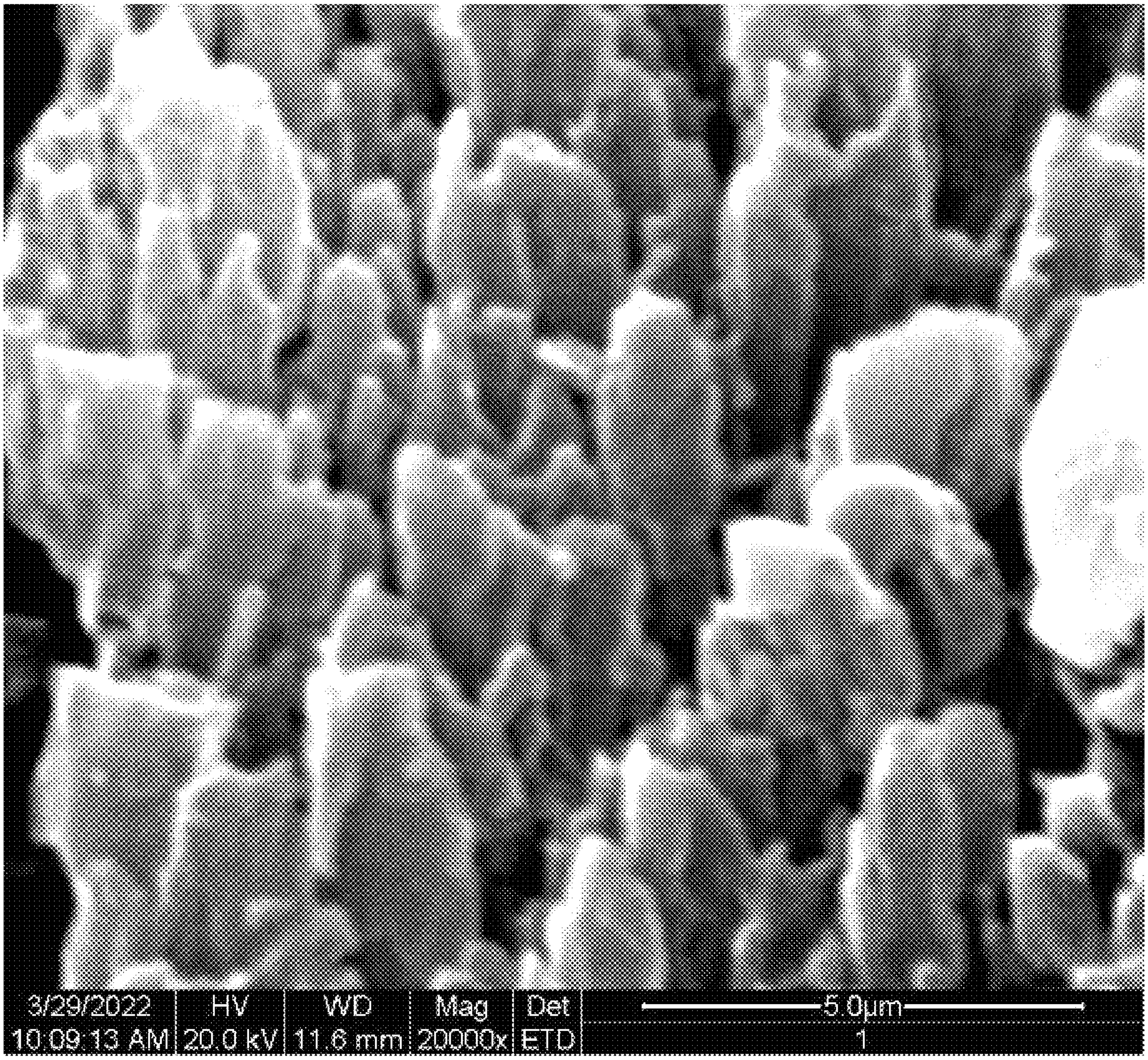
FIG. 7 shows an enlarged SEM image of the highly-branched cyclodextrin grafted with β-cyclodextrin.

FIG. 7 showed an enlarged SEM image of the highly-branched cyclodextrin grafted with β-cyclodextrin. A structure of the β-cyclodextrin was discerned, where a rhombohedral crystalline structure remained. However, after alkali and high-pressure treatments, a rough and uneven surface structure of the crystal appeared, and was beneficial to embedding guest molecules.

The analysis was conducted by determining an immobilization capacity of the β-cyclodextrin and an embedding rate of the cinnamaldehyde, and the results were shown in the table below.

TABLE 1

Determination results of immobilization capacity of β-cyclodextrin and embedding rate of cinnamaldehyde

| SN | Polyacrylic acid immobilization capacity/% | β-cyclodextrin immobilization capacity/% | Cinnamaldehyde embedding rate/% |
|---|---|---|---|
| Control group | 0.9% | 1.3% | 48.3% |
| Experimental group | 3.1% | 14.5% | 81.2% |

The control group was a product that was not subjected to the high-pressure treatment. In the control product, due to the dense branch distribution of the highly-branched cyclodextrin itself and the influence of steric hindrance, the cross-linking of the polyacrylic acid was difficult. This resulted in a low grafting rate of the β-cyclodextrin and a poor embedding effect of the cinnamaldehyde. However, the experimental group followed the normal production process; and after the high-pressure treatment, a branched structure of the highly-branched cyclodextrin was opened, and the steric hindrance was reduced. In this way, the polyacrylic acid was easily combined with the hydroxyl groups on the dextrin branch chain, such that the grafting rate of β-cyclodextrin was improved, and the embedding rate of cinnamaldehyde was also significantly increased.

Example 2

Preparation of a Bifunctional Dextrin Embedding Flavonoid (1) Conducting an alkali treatment on a highly-branched cyclodextrin: 10.0 g of the highly-branched cyclodextrin was added into a 250.0 mL Erlenmeyer flask, 100.0 mL of a 2 mol/L NaOH solution was added, and a treatment in a water bath was conducted at 30° C. for 1 h.

(2) Conducting a high-pressure treatment: a resulting alkali-treated highly-branched cyclodextrin was placed in a high-pressure homogenizer, and homogenization was conducted at a room temperature and a pressure of 200 MPa three times.

(3) Mixing materials: a cross-linking agent polyacrylic acid and a catalyst sodium dihydrogen phosphate were added into an obtained high-pressure-treated highly-branched cyclodextrin, β-cyclodextrin was added, and immersed while stirring for 0.5 h, taken out, and dried; where the polyacrylic acid and the β-cyclodextrin were at a concentration molar ratio of 2:1; and the catalyst sodium dihydrogen phosphate and the cross-linking agent were at a molar ratio of 1:10.

(4) Conducting stepwise heating: an obtained dried product was heated in an oven set at 90° C. for 15 min, heated to 160° C., and treated for 10 min.

(5) Conducting product acquisition: heating was stopped, an obtained heated product was rinsed with a small amount of distilled water, filtering was conducted to remove impurities, washed twice with 50° C. distilled water, dried in an oven, and a resulting finished product was collected.

(6) Obtaining flavonoid embedded in bifunctional dextrin molecules: 5 g of the product and flavonoid were added to the Erlenmeyer flask according to a host-to-guest molar ratio of 1:1, and 100 mL of distilled water was added. An obtained mixture was stirred in a water bath at 45° C. for 48 h, frozen overnight, and an embedding was obtained using a freeze-dryer.

Example 3

Preparation of a Bifunctional Dextrin Embedding DHA (1) Conducting an alkali treatment on a highly-branched cyclodextrin: 10.0 g of the highly-branched cyclodextrin was added into a 250.0 mL Erlenmeyer flask, 100.0 mL of a 2 mol/L NaOH solution was added, and a treatment in a water bath was conducted at 30° C. for 1 h.

(2) Conducting a high-pressure treatment: a resulting alkali-treated highly-branched cyclodextrin was placed in a high-pressure homogenizer, and the homogenization was conducted at a room temperature and a pressure of 200 MPa three times.

(3) Mixing materials: a cross-linking agent polyacrylic acid and a catalyst sodium dihydrogen phosphate were added into an obtained high-pressure-treated highly-branched cyclodextrin, β-cyclodextrin was added, immersed while stirring for 0.5 h, taken out, and dried; where the polyacrylic acid and the β-cyclodextrin were at a concentration molar ratio of 2:1; and the catalyst sodium dihydrogen phosphate and the cross-linking agent were at a molar ratio of 1:10.

(4) Conducting stepwise heating: an obtained dried product was heated in an oven set at 90° C. for 15 min, heated to 160° C., and treated for 10 min.

(5) Conducting product acquisition: heating was stopped, an obtained heated product was rinsed with a small amount of distilled water, filtering was conducted to remove impurities, washed twice with 50° C. distilled water, dried in an oven, and a resulting finished product was collected.

(6) Obtaining DHA embedded in bifunctional dextrin molecules: 5 g of the product and DHA were added to the Erlenmeyer flask according to a host-to-guest molar ratio of 1:3, and 100 mL of distilled water was added. An obtained mixture was stirred in a water bath at 45° C. for 48 h, frozen overnight, and an embedding was obtained using a freeze-dryer.

What is claimed is:

1. A preparation method of a bifunctional dextrin, comprising the following steps:

(1) conducting an alkali treatment on a highly-branched cyclodextrin: adding 10.0 g of the highly-branched cyclodextrin into a 250.0 mL Erlenmeyer flask, adding 100.0 mL of a 2 mol/L NaOH solution, and conducting the alkali treatment in a water bath for 1 h, wherein the alkali treatment in the water bath is conducted at 30° C.;

(2) conducting a high-pressure treatment: dissolving an obtained alkali-treated highly-branched cyclodextrin in deionized water, placing a resulting solution in a high-pressure homogenizer, and conducting homogenization at a room temperature three times, wherein the high-pressure treatment is conducted at 200 MPa;

(3) conducting esterification and cross-linking: adding a cross-linking agent polyacrylic acid and a catalyst sodium dihydrogen phosphate into an obtained high-pressure-treated highly-branched cyclodextrin, stirring while heating at 50° C. for 10 min, adding β-cyclodextrin, immersing while stirring for 0.5 h, taking out a resulting system, and subjecting the resulting system to washing and drying in sequence, wherein the polyacrylic acid and the β-cyclodextrin are at a concentration molar ratio of 2:1;

(4) conducting stepwise heating: preheating an obtained dried product in an oven set at 90° C. for 15 min, heating to 160° C., and treating for 10 min; and (5) conducting product acquisition: stopping heating, rinsing an obtained heated product with a small amount of distilled water, conducting filtering to remove impurities, washing twice with 50° C. distilled water, drying in an oven, and collecting a resulting finished product, namely, the bifunctional dextrin with a high embedding rate and rapid absorption.

2. The preparation method of the bifunctional dextrin according to claim 1, wherein the catalyst sodium dihydrogen phosphate and the cross-linking agent are at a molar ratio of 1:10.

* * * * *